Dec. 22, 1959     P. V. BOESCH     2,918,237
FISHING ROD HOLDERS
Filed May 1, 1957     3 Sheets-Sheet 1
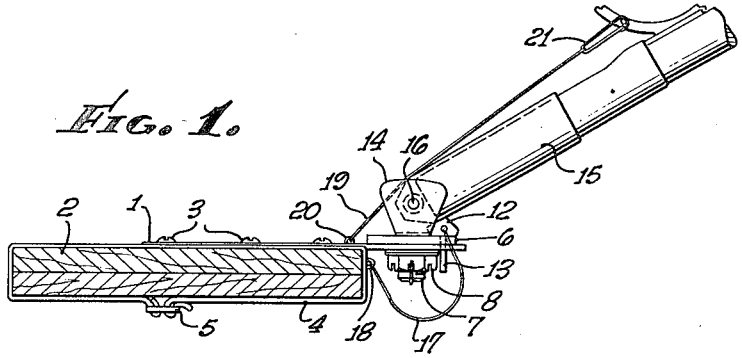
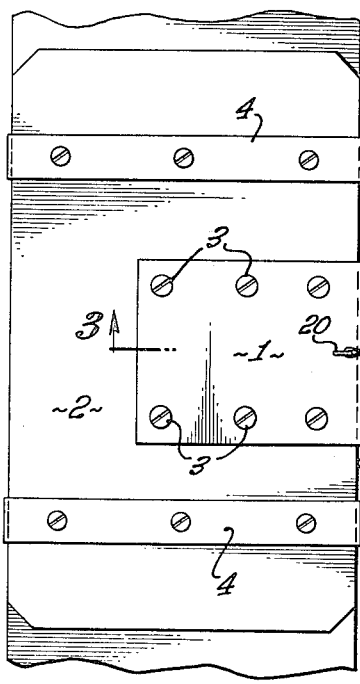
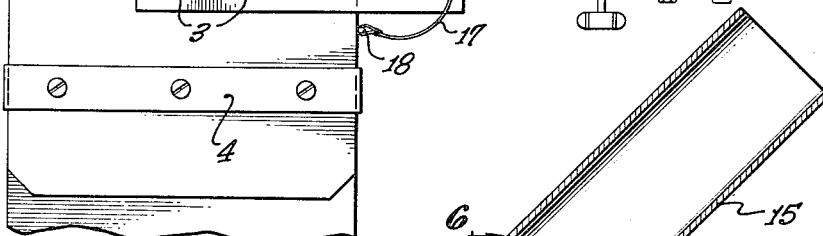
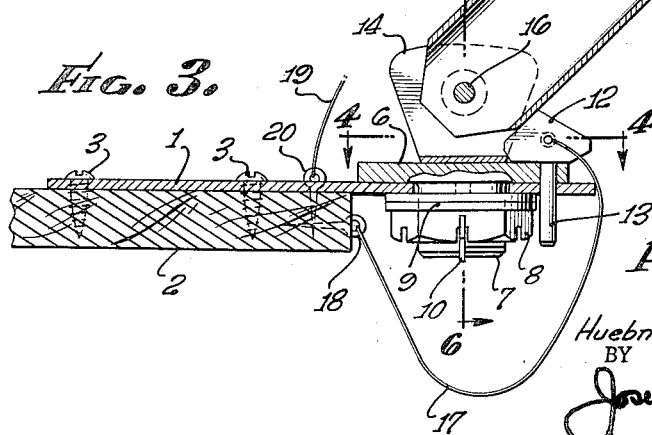
PETER V. BOESCH,
INVENTOR.
Huebner, Beehler & Worrel
BY
ATTORNEYS.

Dec. 22, 1959 P. V. BOESCH 2,918,237
FISHING ROD HOLDERS
Filed May 1, 1957 3 Sheets-Sheet 2
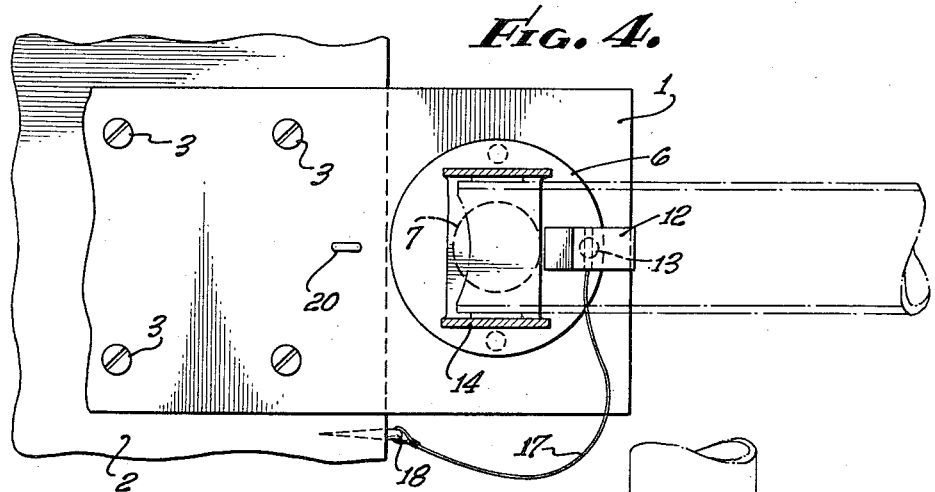
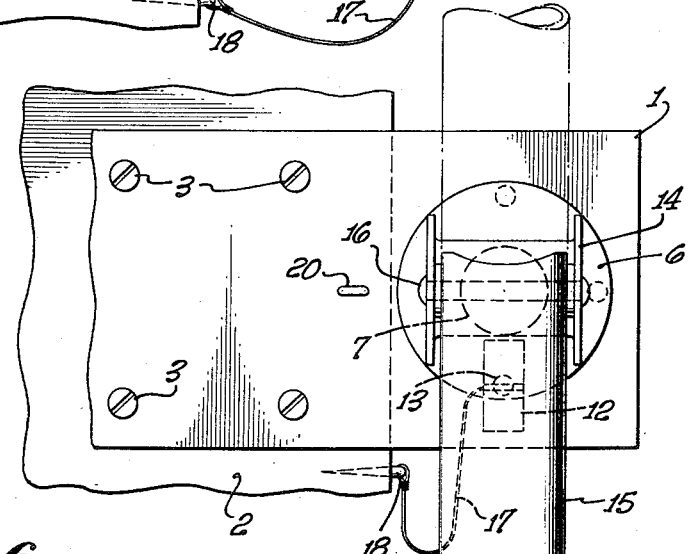
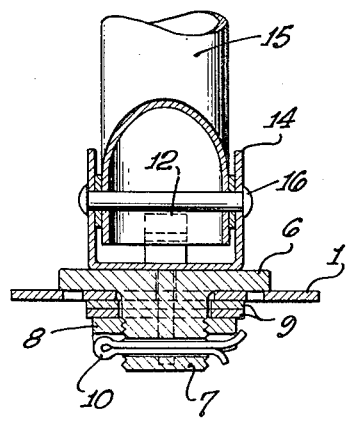
PETER V. BOESCH,
INVENTOR.
Huebner, Beehler & Worrel
BY
ATTORNEYS.

Dec. 22, 1959  P. V. BOESCH  2,918,237
FISHING ROD HOLDERS

Filed May 1, 1957  3 Sheets-Sheet 3

PETER V. BOESCH,
INVENTOR.

Huebner, Beehler & Worrel
BY
ATTORNEYS.

United States Patent Office 2,918,237
Patented Dec. 22, 1959

2,918,237

FISHING ROD HOLDERS

Peter V. Boesch, Manhattan Beach, Calif.

Application May 1, 1957, Serial No. 656,401

2 Claims. (Cl. 248—42)

This invention relates to fishing rod holders and more particularly to a new and improved holder for supporting a fishing rod in movable or fixed position.

When fishing from a boat, it is often desirable to support a fishing rod in a fixed position. Although attempts have been made in the past to design a device for this purpose, previously known devices frequently are incapable of holding a fishing pole in a fixed position with the fishing pole being readily available for use.

In addition, for some types of fishing, a support for the butt end of a fishing rod is employed which relieves the effort required of a fisherman while at the same time allowing the rod to be moved and positioned so as to follow the direction of pull of a fish. In large boats especially equipped for ocean fishing, a swivel type chair is attached to the boat with special brackets for holding the butt end of the fishing rod in position. However, such mechanisms require the constant attention of the fisherman so that the fishing rod cannot be left unattended. In smaller boats where the fisherman has other tasks to perform, a device is needed for supporting a fishing rod during unattended intervals with the butt end of the fishing rod being supported so that the fishing rod may be moved and positioned when the fisherman is manipulating the fishing rod.

Accordingly, it is one object of the present invention to provide a new and improved fishing rod holder which is adapted to hold a fishing rod in a selected fixed position.

It is another object of the present invention to provide a fishing rod holder for selectively supporting a fishing rod in fixed or movable position.

It is an additional object of the present invention to provide a new and improved swiveling full rotating fishing rod holder which is adapted to be attached to a boat and which is adapted to support a fishing rod in a fixed position and is further adapted to hold the butt end of a fishing rod when desired with the rod being movable.

Briefly, in accordance with the invention, a rotary platform is supported on a fixed base plate, the rotary platform and the base plate are provided with indexing holes, a U-shaped bracket is supported on the rotary platform, a fishing rod receiver is pivotally supported in the U-shaped bracket, a positioning pin is adapted to be thrust through holes in the rotary platform and the base plate and the upper portion of the positioning pin is fashioned in the shape of a block having angular faces against which the fishing rod receiver rests. When it is desired to manipulate the fishing rod without removing the rod from the receiver, the positioning pin may be withdrawn.

A better understanding of the invention may be had from a reading of the following detailed description and an inspection of the drawings, in which:

Fig. 1 is an elevational view of a fishing rod holder constructed in accordance with the invention;

Fig. 2 is a top view of the fishing rod holder of Fig. 1;

Fig. 3 is a sectional view taken along line 3—3 of Fig. 2;

Fig. 4 is a sectional view taken along line 4—4 of Fig. 3;

Fig. 5 is a top view of a portion of the holder similar to Fig. 2 with the fishing rod receiver in another position;

Fig. 6 is a sectional view taken along line 6—6 of Fig. 3; and

Figure 7:
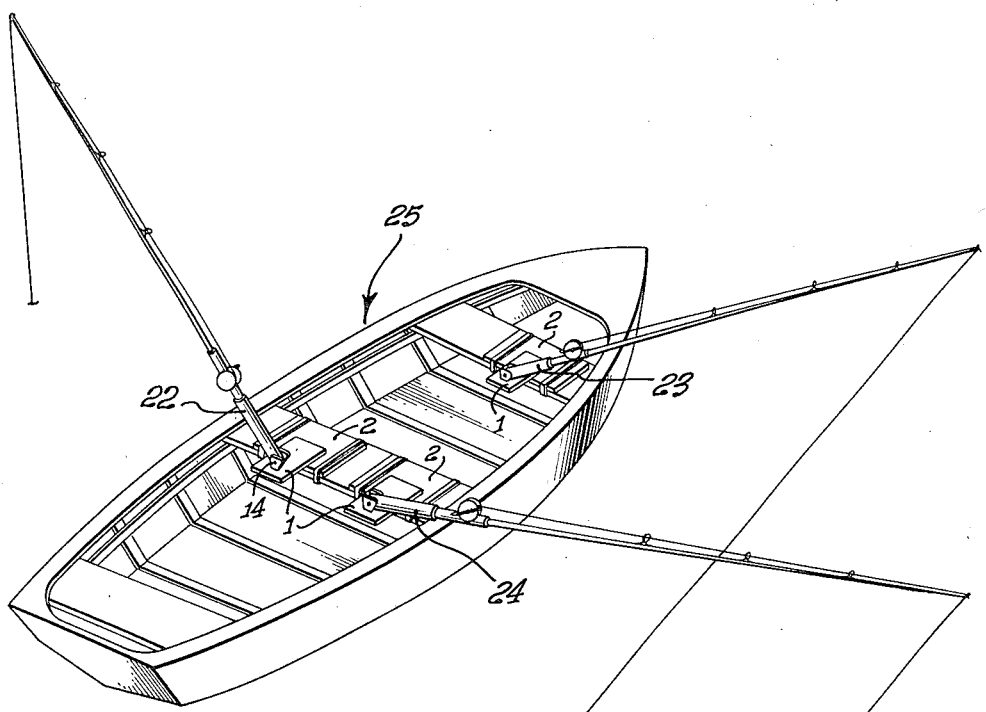
Fig. 7 is a perspective view of a boat equipped with three fishing rod holders constructed in accordance with the invention.

The combination seat and fishing rod holder of Figs. 1–7 includes a base plate 1 which is fastened in overhanging position to a seat board 2 by means of six wood screws 3. Attached to the seat board 2 are the straps 4 having buckles 5 for fastening the seat board 2 in fixed position (Figs. 1 and 2).

A rotary platform 6 mounted on the base plate 1 includes a shaft 7 which extends downwardly through a hole in the base plate 1. The shaft 7 terminates in a threaded portion which receives a nut 8. A pair of washers 9 located between the nut 8 and the bottom part of the base plate 1, allows the platform 6 to be turned on the base plate 1. In order to lock the nut 8 in place on the shaft 7, the nut 8 may be castellated as shown (Fig. 3) and a cotter key 10 may be inserted through a hole in the shaft 7 to engage one of the slots in the castellated nut 8.

The platform 6 includes at least one positioning hole which may be brought into alignment with any one of a plurality of positioning holes beneath the platform 6 in the base plate 1. In the illustrative embodiment there are three positioning holes in the base plate 1 (Figs. 4 and 5). A positioning pin having an upper block portion 12 and a shank 13 (Fig. 3) is adapted to be inserted through the positioning hole in the platform 6 and one of the positioning holes of the base plate 1. When the shank 13 engages the positioning hole of the platform 6 and one of the positioning holes of the base plate 1, the platform 6 is locked in position and is no longer free to rotate.

On the upper surface of the platform 6 is fastened a U-shaped bracket or yoke 14. A fishing rod receiver in the form of a tube 15 is pivotally supported between the upper arms of the U-shaped bracket 14 by means of a pivot pin 16. The lower end of the fishing rod receiver tube 15 may be cut in a taper as shown to allow added clearance for movement of the tube 15 in the bracket 14.

When the positioning pin is in place, the block 12 provides a rest upon which the fishing rod receiver tube 15 is supported in angular position.

The block 12 is formed to provide two different faces against which the tube 15 may rest. By turning the block 12 end for end, two separate positions of the tube 15 and a fishing rod may be secured.

A cable 17 is fixed at one end by means of a screw eye hook 18 to the seat board 2. The opposite end of the cable 17 may be fastened to the block 12 so that the positioning pin is always ready at hand for insertion in the platform 6 and the base plate 1 to fix the fishing rod receiving tube 15 in position. In addition, a second cable 19 may be fixed to the seat board 2 by means of a screw eye hook 20. The opposite end of the cable 19 may be equipped with a snap fastener 21 which is adapted to be fastened to a fishing reel on a fishing rod inserted in the fishing rod receiving tube 15 (Fig. 1) so that the reel and rod cannot be pulled from the receiver tube 15.

Fig. 7 shows three fishing rod holders 22, 23 and 24 of the type illustrated in Figs. 1–6 fastened in position in a small boat 25 for use. It will be noted in Fig. 7 that the fishing rods are held in position so that trolling may take place without attention from the fisherman.

In operation, the improved fishing rod holder of Figs. 1-6 is fastened to a surface, such as a boat seat by means of the straps 4 and the buckles 5. The butt end of a fishing rod is then thrust into the fishing rod receiver 15 and the snap fastener 21 on the end of the cable 19 is snapped to the reel on the fishing rod. Next, the position of the fishing rod is selected and the shank 13 of the positioning pin is inserted through the positioning hole of the rotary platform to engage one of the positioning holes in the base plate 1. At the same time, the block 12 is turned so that the tube 15 rests against the block at the desired slope. Various possible positions of the receiver tube 15 with respect to the seat board 2 may be seen in Figs. 4, 5 and 7 in which the fishing rod may be extended over the end of the boat or over the side of the boat for outrigger type trolling.

Upon receiving a strike on a fishing line extending from a rod held in a fishing rod holder of the invention, the fisherman may raise the rod and remove the shank 13 of the positioning pin from the rotary platform 6 and base plate 1. After the positioning pin is removed the fishing rod is free to be raised or lowered or swung from side to side with the butt end of the fishing rod being supported in the fishing rod receiver tube 15 so that the amount of work required by the fisherman in manipulating the rod and bringing the fish alongside the boat is substantially reduced.

What is claimed is:

1. A fishing rod holder including the combination of a seat board which is adapted to be fastened to a portion of a boat, a base plate mounted on the seat board in a position in which the base plate overhangs the seat board, a rotary platform fastened on the overhanging portion of the base plate, a positioning pin engageable with said rotary platform and said base plate, for locking said base plate in fixed position, a yoke fastened to the rotary platform, a fishing rod receiving tube pivotally supported in the yoke, and a block fastened to the positioning pin beneath the fishing rod receiving tube having at least two angular faces against which the fishing rod receiving tube is adapted to rest to support a fishing rod in at least two separate positions with respect to the seat board.

2. A fishing rod holder comprising a base, a rotatable platform mounted on said base for rotation in one plane, a positioning pin, said pin having a shank and a block on one end thereof, said rotatable platform and said base having alignable holes therethrough into which said shank of said pin is removably insertable to lock said rotatable platform with respect to said base, a yoke mounted on said rotatable platform, a fishing rod receiver pivotally connected to said yoke and rotatable at right angles with respect to the plane of rotation of said rotatable platform, said block of said positioning pin having at least two angular faces engageable with portions of said fishing rod receiver adjacent said yoke for thereby limiting the rotational movement of said fishing rod receiver and supporting said fishing rod receiver in at least two separate positions.

References Cited in the file of this patent

UNITED STATES PATENTS

| 2,529,148 | Fratt | Nov. 7, 1950 |
| 2,734,555 | Kroner | Feb. 14, 1956 |

FOREIGN PATENTS

| 13,052 | Great Britain | Oct. 1, 1884 |
| 260,505 | Switzerland | Mar. 31, 1949 |
| 969,794 | France | May 31, 1950 |